United States Patent [19]

Iizuka et al.

[11] Patent Number: 4,646,156

[45] Date of Patent: Feb. 24, 1987

[54] HIGH-SPEED VIDEO CAMERA AND METHOD OF HIGH-SPEED IMAGING USING A BEAM SPLITTER

[75] Inventors: Jiro Iizuka; Akira Ozu, both of Tokyo, Japan

[73] Assignee: Victor Company of Japan, Japan

[21] Appl. No.: 799,164

[22] Filed: Nov. 18, 1985

[30] Foreign Application Priority Data

Nov. 19, 1984 [JP] Japan .................................. 59-243593

[51] Int. Cl.⁴ ............................................ H04N 5/225
[52] U.S. Cl. ..................................................... 358/225
[58] Field of Search ................ 358/225, 226; 354/120, 354/122, 125; 352/46, 62, 82, 83, 84, 208, 214, 218

[56] References Cited

U.S. PATENT DOCUMENTS

| | | | |
|---|---|---|---|
| 3,303,271 | 2/1967 | Hecker | 358/225 |
| 3,443,499 | 5/1969 | Gianino | 354/125 X |
| 3,580,153 | 5/1971 | Fukushima | 354/125 |
| 4,589,030 | 5/1986 | Kley | 358/225 |
| 4,597,015 | 6/1986 | Johnson | 358/225 |

Primary Examiner—William B. Perkey
Attorney, Agent, or Firm—Lowe, Price, Leblanc, Becker & Shur

[57] ABSTRACT

In a high-speed video camera, a light beam from a main lens (3) is split into a plurality of light beams having identical optical information, and then these plurality of light beams are intermittently transmitted to different positions of an imaging device (11) in sequence. As a beam splitter may be used a multi-lens assembly (8) or a prism (14) having a plurality of light-receiving surfaces. In order to intermittently transmit the plurality of light beams in sequence to the imaging device, an image-selecting rotary shutter (12) having a fan-shaped opening (12a) is used. This shutter (12) and another shutter (5) for defining exposure time are synchronized with each other, and also synchronized with a vertical sync signal from a sync generator. In order to establish synchronization an adjustable delay circuit (38) is used.

11 Claims, 14 Drawing Figures

U.S. Patent  Feb. 24, 1987  Sheet 1 of 6  4,646,156
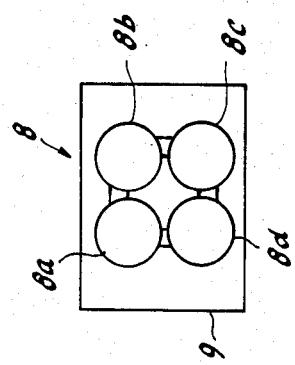
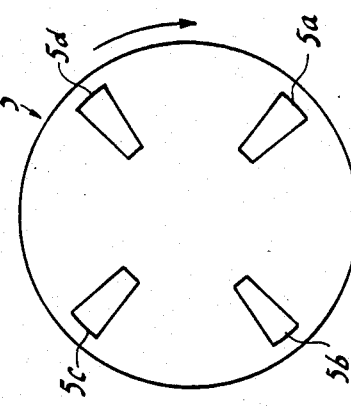
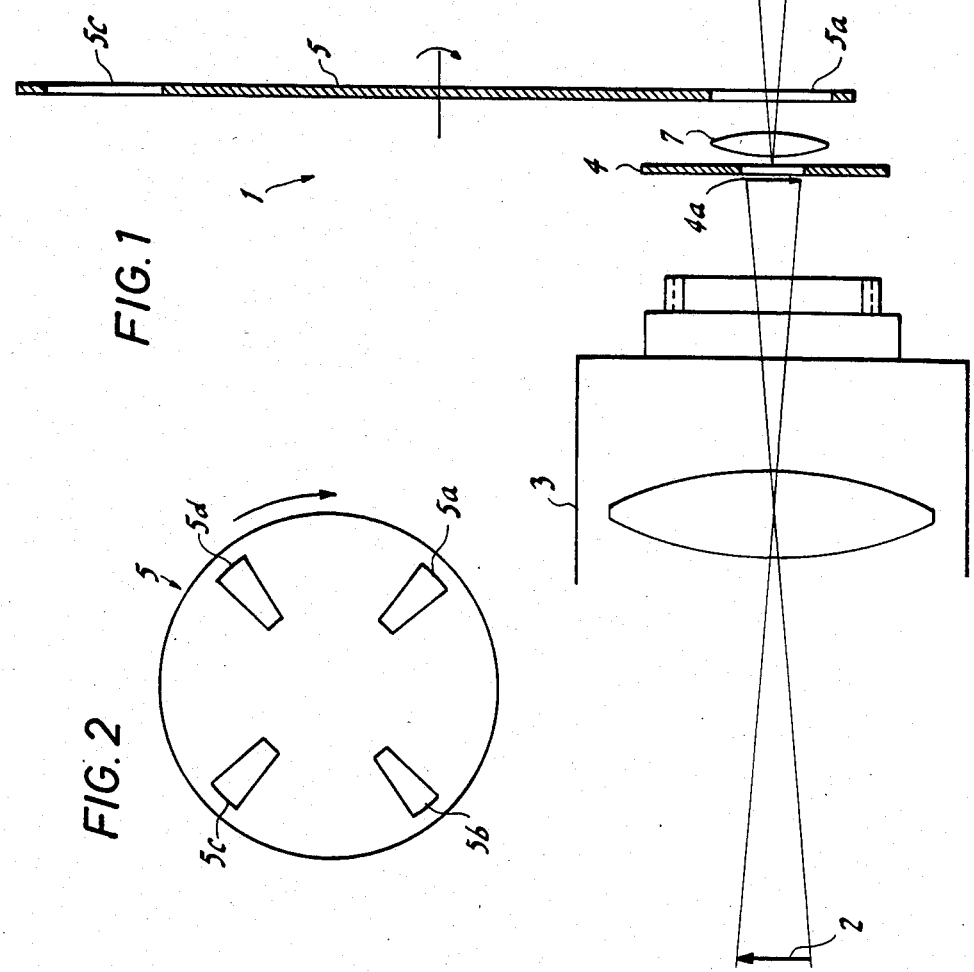

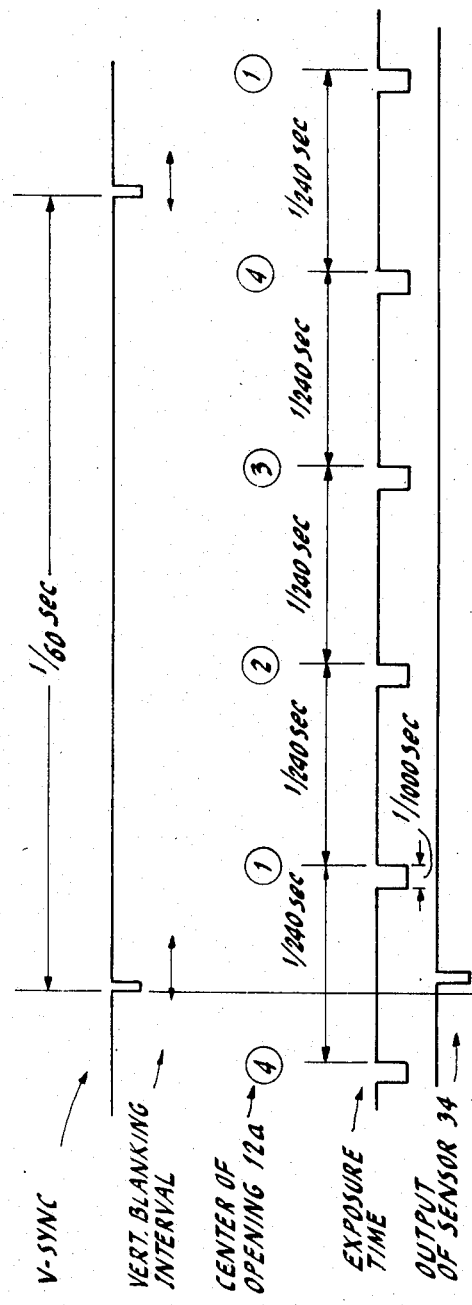
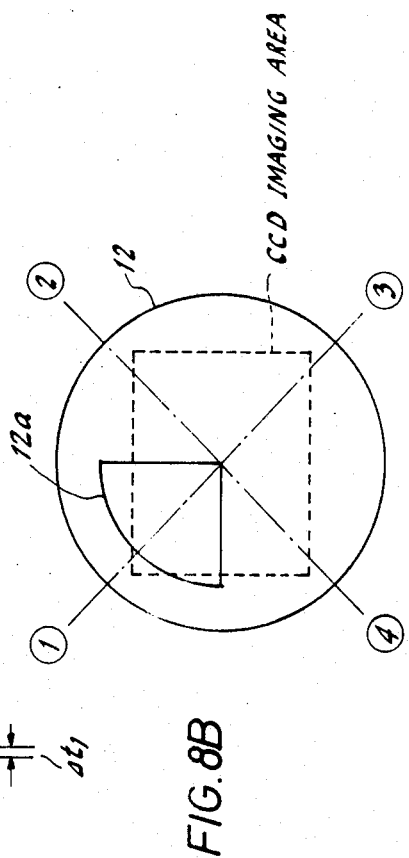
FIG. 8A
FIG. 8B

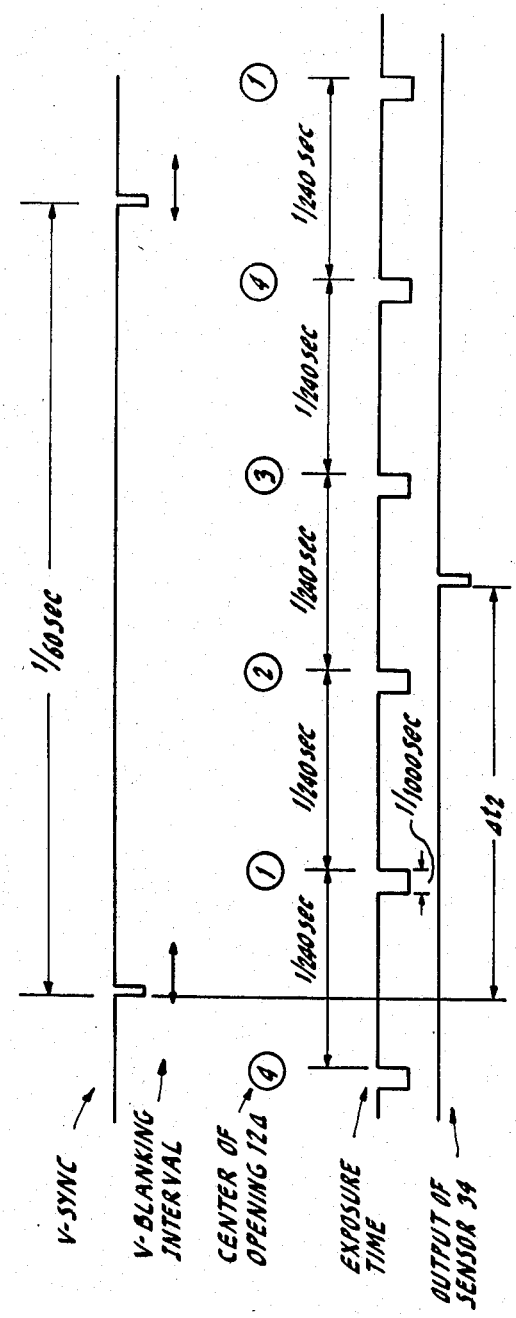
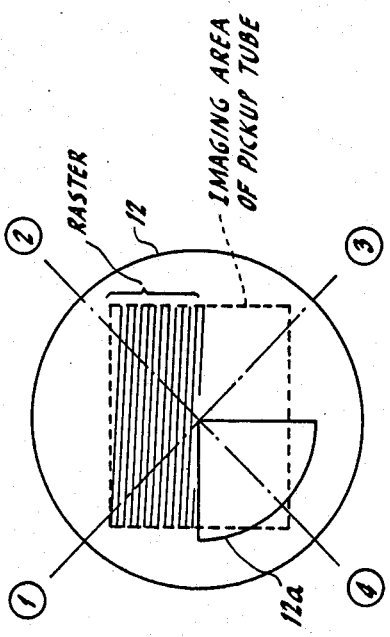
FIG. 9A
FIG. 9B

HIGH-SPEED VIDEO CAMERA AND METHOD OF HIGH-SPEED IMAGING USING A BEAM SPLITTER

BACKGROUND OF THE INVENTION

This invention relates generally to a video camera, and more particularly to a high speed video camera with which an object taken through a main lens is picked up at a high speed.

There are various types of conventional high-speed video cameras with which an object moving or varying at a high speed is taken. As such high speed video cameras are known standard system (NTSC system) in which imaging is performed at a high speed according to standard system, and special systems called NHK system and Kodak system respectively in which imaging is performed at a speed higher than that of the standard system.

According to the standard system, a rotary shutter having a shutter speed of 1/60 sec is provided between a main lens and an image pickup plane so as to perform exposure at an interval of 1/60 sec, and then one picture is scanned at an interval of 1/60 sec to image 60 fields or 30 frames per second. In the special system for instance in NAC system, the horizontal and vertical scanning speeds of an imaging plane are made three times those of the standard system, and an image signal obtained from such a video camera is recorded by a speicial video tape recorder arranged such that the rotational speed of the rotary cylinder and tape running speed are both three times those in a standard system video tape recorder so that a picture of 180 fields can be taken per second. In NHK system, imaging is performed to obtain 180 fields per second with the horizontal and vertical scanning speeds being three times those in standard system, and then a resulted image signal is written into a memory once and is read out at a standard scanning speed to obtain three different signals. These three different signals are then recorded on a magnetic tape to form three parallel tracks by way of a special video tape recorder having three magnetic heads mounted on a rotary cylinder. In Kodak system, a picture taken by a video camera having a solid-state imager is recorded by a special video tape recorder which records 6 groups of pictures in parallel with 196 horizontal scanning lines being divided into 6 groups each having 32 consecutive horizontal scanning lines. As a result, 2000 fields are recorded/reproduced per second.

In another system, two video cameras are used to take the same object respectively at a shutter speed of 1/60 second with a time difference of 1/120 second therebetween, and imaging signals obtained respectively from these two video cameras are reproduced on a single monitor screen in parallel by way of a special effect apparatus so as to reproduce the picture at the right and left halves of the screen alternately at an interval of 1/120 second.

With these conventional video cameras, however, there have been the following disadvantages. In the standard system, although slow motion picture is readily obtained with a relatively low cost video taperecorder with which the same field or frame is repeatedly reproduced several times, the imaging interval is limited to either 1/30 or 1/60 second, and high-speed imaging higher than these cannot be attained. In the special systems, such as NAC system, NHK system and Kodak system, although imaging speed is much higher than that of the standard system, all of these special systems require not only a special camera but also a special recording/reproducing apparatus. As a result, manufacturing cost of such special systems is extremely high, while equipment of the standard system cannot be used. Moreover, in the system using two video cameras, it is time-consuming and troublesome to adjust focal length, diaphragm of the two cameras while there arises a problem of parallax.

SUMMARY OF THE INVENTION

The present invention has been developed in order to remove the above-described drawbacks inherent to the conventional high-speed video camera.

It is, therefore, an object of the present invention to provide new and useful high-speed video camera and method of high-speed imaging.

According to a feature of the present invention a beam splitter or multiplier is used to produce a plurality of light beams having substantially same optical information of a taking object, and the plurality of beams are applied to different positions of an imaging device is sequence with a time difference between any two consecutive images.

In accordance with the present invention there is provided a high-speed video camera comprising: a main lens for producing a light beam of a taking object; a first shutter means for intermittently transmitting said light beam from said main lens; beam splitting means responsive to said light beam from said first shutter means for producing a plurality of substantially identical light beams; a second shutter means for transmitting said plurality of light beams in sequence in synchronism with said first shutter means; and image pickup means responsive to said plurality of light beams passed through said second shutter means.

In accordance with the present invention there is also provided a method of high-speed imaging for a video camera, comprising the steps of: producing a light beam of a taking object; intermittently transmitting said light beam to determine an exposure time; splitting said light beam intermittently transmitted into a plurality of beams having substantially the same image information; and transmitting said plurality of beams in sequence so as to form a plurality of different images on an image pickup plane of an imaging device.

BRIEF DESCRIPTION OF THE DRAWINGS

The object and features of the present invention will become more readily apparent from the following detailed description of the preferred embodiments taken in conjunction with the accompanying drawings in which:

FIG. 1 is a cross-sectional side view of a first embodiment of a high-speed video camera according to the present invention;

FIG. 2 is a top plan view of a rotary shutter shown in FIG. 1;

FIG. 3 is a top plan view of a multi-lens assembly shown in FIG. 1;

FIG. 8A is a timing chart showing the relationship between the vertical sync signal, and the positions of the two rotary shutters in the case a CCD imager is used;

FIG. 8B shows the rotational position of the image-selecting rotary shutter;

FIGS. 9A and 9B are diagrams similar to FIGS. 8A and 8B for the description of the operation when a pickup tube is used as an imaging device;

The same or corresponding elements and parts are designated at like reference numerals throughout the drawings.

DETAILED DESCRIPTION OF THE INVENTION

Figure 4:
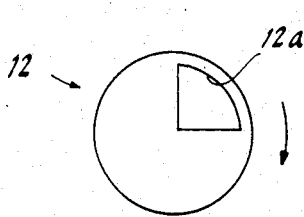
FIG. 4 is a top plan view of an image-selecting rotary shutter shown in FIG. 1.

Referring now to FIG. 1, a cross-sectional side view of a first embodiment of a high-speed video camera according to the present invention is shown. In FIG. 1, when an object 2 is taken by the video camera 1, the object 2 is imaged through a main lens 3 at a position of an aperture frame 4. In the aperture frame 4 is made an aperture 4a so that the size of a picture is limited to a necessary value for taking. Therefore, extra portion surrounding a real image imaged through the main lens 3 does not pass through the aperture 4a of the aperture frame 4, and only a picture image within a given picture size is picked up.

The main lens 3 is a 16 mm cine camera lens which is a C-mount lens, and may be replaced readily with other C-mount lens. The referene 5 is a rotary shutter having four fan-shaped openings or slits 5a through 5d arranged equiangularly at an angle of 90 degrees. When the rotary shutter 5 rotates, the openings 5a–5d face the aperture 4a of the aperture frame 4 one after another so that desired exposing time is obtained depending on the opening angle of the openings 5a–5d. When each of the openings 5a–5d substends 20° with respect to the center of the rotary shutter 5, and when the rotary shutter 5 rotates at a speed of 60 rps, then each opening 5a–5d admits light at a shutter speed of 1/1080 second. The reference 6 is a lens which outputs parallel light rays in receipt of light from the object 2 applied through the aperture 4a and one of the openings 5a–5d. These light rays from the lens 6 propagate as a light beam. The reference 7 is a pupil-alignment lens provided for reducing the difference between pupil positions of the main lens 3 and the lens 6 so as to perform pupil alignment.

Although the pupil-alignment lens 7 is positioned behind the aperture frame 4 in the illustrated embodiment, this lens 7 may be positioned before the aperture frame 4 if desired. As the pupil-alignment lens 7 may be used a convex or concave lens depending on the pupil positions of the main lens 3 and the lens 6.

Behind the lens 6 is provided a multi-lens assembly 8 which splits the light beam from the object 2 and the lens 6 into a plurality of beams so as to project a plurality of identical images. In this embodiment, the multi-lens assembly 8 comprises 4 lenses 8a–8d which are secured on a plane by way of a frame 9. The focal length of each of these lenses 8a–8d is one half the focal length of the lens 6. The lens 6 and the multi-lens assembly 8 form together a relay lens system 10. Although the lens 6 in the relay lens system 10 is positioned before the multi-lens assembly 8 in the illustrated embodiment, the positional relationship may be reversed so that the former is placed behind the latter. When the lens 8a–8d have relative large diameter, these lenses may be arranged so that these lenses are in contact with adjacent lenses with contacting portions thereof being cut off. In such an arrangement, light from one lens is apt to leak to adjacent lenses via the contacting portion. In order to prevent such light leak, a light-blocking element, such as black element may be inserted between two adjacent lenses. In place of using such particular light-blocking element, the contacting portion of the lens may be frosted.

Behind the multi-lens assembly 8 is placed an image-selecting rotary shutter 12 having an opening 12a subtending 90° or more as shown in FIG. 4. More specifically the opening 12a which is fan-shaped may subtend an angle between 90° and 110°. The image-selecting rotary shutter 12 is positioned between the multi-lens assembly 8 and an imaging plane 11a of a solid-state imaging device 11 so as to be coaxial with the center of the multi-lens assembly 8. The image-selecting rotary shutter 12 is arranged to rotate at a predetermined rotational speed so that the opening 12a thereof faces one of the openings 5a–5d of the aforementioned rotary shutter 5 rotating at 60 rps. In detail, the image-selecting rotary shutter 12 rotates at the same rotational speed, i.e. 60 rps in this embodiment, as that of the rotary shutter 5. Therefore, the opening 12a of the image-selecting rotary shutter 12 faces respective lenses 8a–8d of the multi-lens assembly 8 in sequence at a shutter speed of 1/240 second. At this time, the rotary shutter 5 is arranged to rotate so that its openings 5a–5d are positioned to pass the light beam from the main lens 3 and the aperture 4a to the relay lens system 10 in sequence at a shutter speed of 1/1080 second. As the imaging device 11 may be used a CCD imager which is well known.

The image-selecting rotary shutter 12 and the rotary shutter 5 rotate at the same speed so that the opening 12 of the former is synchronized with the four openings 5a–5d of the latter in connection with the light beam forming the real image of the object 2. More specifically, when the opening 12a of the image-selecting rotary shutter 12 faces the lens 8a of the multi-lens assembly 8 at a shutter speed of 1/240 second, the opening 5a of the other rotary shutter 5 is positoined to allow the light beam from the aperture 4a to be transmitted to the relay lens system 10 at a shutter speed of 1/1080 second. After this, when the opening 12a faces the lens 8b, the opening 5b is positioned to allow the light beam from the aperture 4a to be transmitted to the relay lens system 10.

Figure 5:
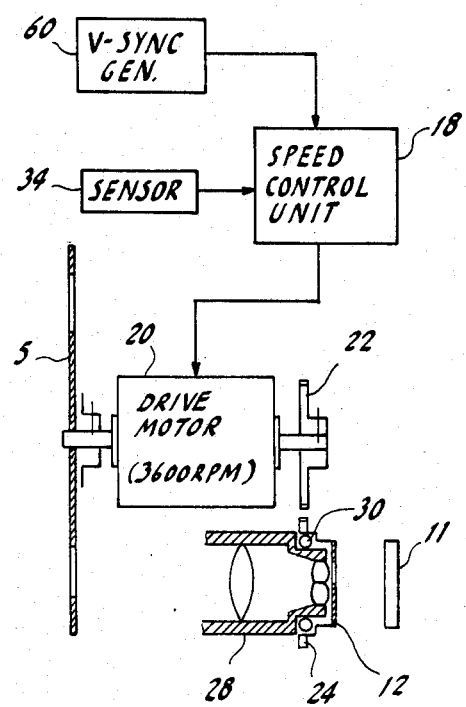
FIG. 5. is a cross-sectional side view showing how the two rotary shutters of FIG. 1 are driven in synchonism.

FIG. 5 shows how the above-mentioned two rotary shutters 5 and 12 are driven. Although it is possible to drive these two rotary shutters 5 and 12 separately by two different motors, it is preferable to use a single motor to simplify the driving system. In the illustrated embodiment, a single electrical motor 20 is employed to drive both the rotary shutters 5 and 12 which are mechanically coupled with the drive motor 20. In detail, the relative rotational angle or position between these two rotary shutters 5 and 12 is first set and under this condition, these two rotary shutters 5 and 12 are mechanically coupled to be driven by the drive motor 20.

In the illustrated embodiment, the rotary shutter 5 is mounted on a drive shaft 20a of the motor 20, while the image-selecting rotary shutter 12 is mounted on a pulley 24 coupled by a belt 26 with another pulley 22 mounted on the drive shaft 20a of the motor 20.

Figure 6:
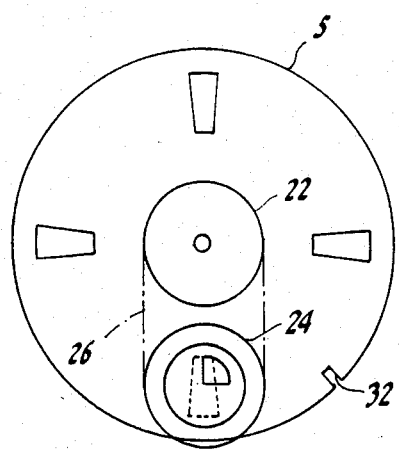
FIG. 6 is a schematic rear view showing the relationship between the two rotary shutters.

FIG. 6 is a schematic rear view showing the relationship between the two rotary shutters 5 and 12. The pulleys 22 and 24 are so called timing pulleys having equal number of gear teeth and are coupled by the belt 26 which is so called timing belt. In place of such belt-coupling may be used gear-coupling if desired. Turning back to FIG. 5, the image-selecting rotary shutter 12 is cup-shaped so that its peripheral edge is mounted on the pulley 24 which is annular shaped. The pulley 24 is rotatably supported via ball bearing 30 around an optical cylinder 28 in which the multi-lens assembly 8 is supported.

The drive motor 20 is controlled by a speed control unit 18 responsive to a signal from a rotation sensor 34 positioned around the rotary shutter 5 to detect a recess or through-hole 32 made in the rotary shutter 5. This rotation sensor 34 may be a well known optical sensor having a light source and a photosensitive element (both not shown) to detect when the recess 32 passes. As described in the above, in order that the rotary shutters 5 and 12 rotate at 60 rps, i.e. 3600 rpm, speed control is performed using the signal from the rotation sensor 34 and a vertical synchronous signal having a frequency of 60 Hz.

Figure 7:
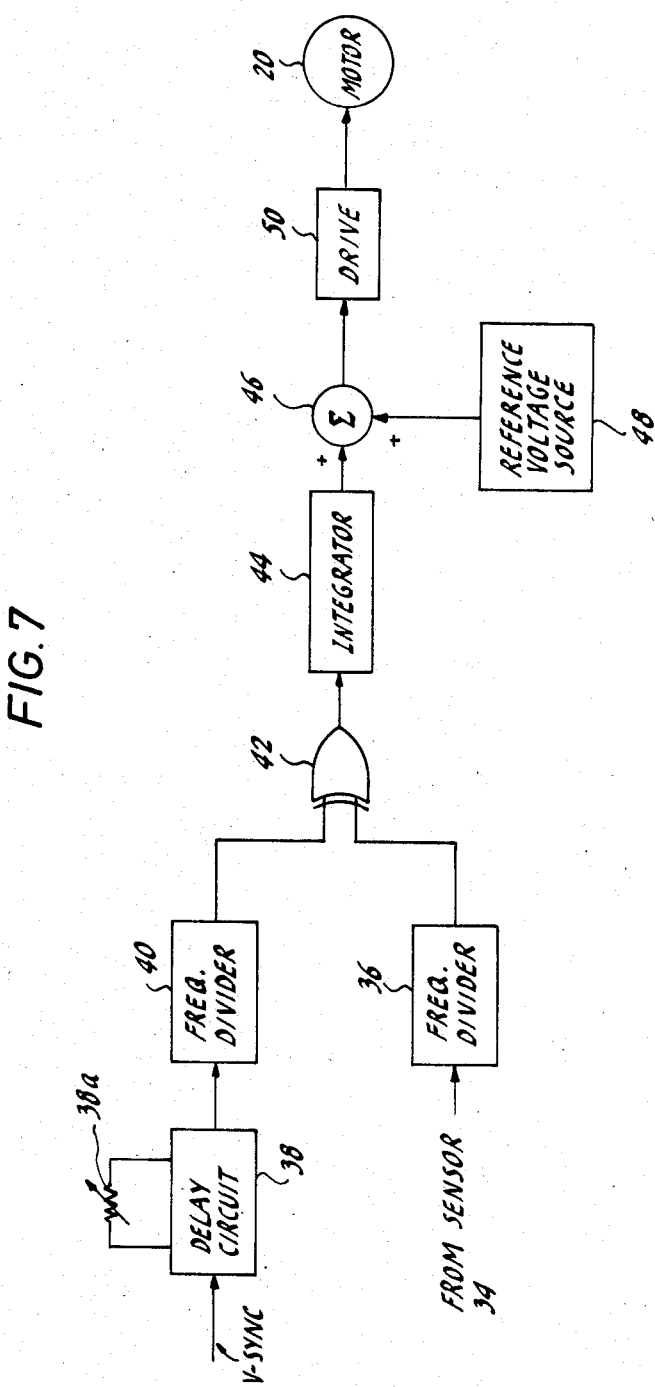
FIG. 7 is a block diagram of a speed control unit shown in FIG. 5.

FIG. 7 shows a block diagram of the speed control unit 18. The speed control unit 18 comprises a frequency divider 36 responsive to the output signal from the rotation sensor 34 so as to divide the frequency of the signal into two. In the case that 60 Hz signal is applied from the sensor 34, then the output signal from the frequency divider 36 is 30 Hz. To the speed control unit 18 is also applied the vertical sync signal of 60 Hz from a vertical sync signal generator 60 (see FIG. 5). This vertical sync signal is fed to a delay circuit 38 in which the amount of delay is adjustable, and a delayed vertical sync signal is fed to another frequency divider 40 so that the frequency is divided into two. As a result 30 Hz signal is obtained. Two output signals from the two frequency dividers 36 and 40 are fed to an EXCLUSIVE OR gate 42. An output signal from this EXCLUSIVE OR gate 42 is fed via an integrator 44 to an adder 46 to which a reference voltage from a reference voltage source 48 is applied. An output signal from the adder 46 obtained by adding the output signal from the integrator 44 to the reference voltage is then fed to a drive amplifier 50 to produce a drive current fed to the drive motor 20. The drive motor 20 is a d.c. motor whose rated speed is 3600 rpm.

The delay circuit 38 is adjustable so that the amount of delay can be controlled by a control signal which may be manually produced using a potentiometer or the like. By manually adjusting the amount of delay of the vertical sync signal, it is possible to minimize the phase difference between the vertical sync signal and the signal from the rotation sensor 34. As a result when the phase difference is made zero, the rotational speed of the rotary shutters 5 and 12 is synchronized with the vertical sync signal, and also the position of the opening 12a of the image-selecting rotary shutter as well as the position of the openings 5a-5d of the rotary shutter 5 is synchronized with the vertical sync signal. As the delay circuit may be used a monostable multivibrator whose time constant is adjustable by a variable resistor 38a as shown in FIG. 7. Although the vertical sync signal is delayed in the illustrated embodiment, the signal from the rotation sensor 34 may be delayed instead to obtain substantially the same result.

FIG. 8A is a timing chart showing the relationship between the vertical sync signal, and the positions of the two rotary shutters 5 and 12 in the case a CCD imager is used so that image information from all the pixels of the CCD imager is transferred at once during vertical blanking interval. In FIG. 8A the reference Δt1 indicates the phase difference between the vertical sync signal and the signal from the rotation sensor 34, and this phase difference corresponds to the time length of the delay to be delayed by the delay circuit 38 of the speed control unit of FIG. 7.

FIG. 8B shows the rotational position of the image-selecting rotary shutter 12. The references ①②③④ respectively indicate the position of the opening 12a, and these references are also shown in FIG. 8A to indicate that the image-selecting rotary shutter 12 rotates clockwise when viewed from the object 2. It is assumed that the recess 32 used for detecting the rotational angle of the rotary shutters 5 and 12 is provided between two slits or openings 5a and 5d which are used for position ① and ④ of the image-selecting rotary shutter 12.

When a CCD imager, whose imaging area is shown by dotted lines, is used, the entire imaging area is subjected to exposure for storing charges in all the pixels depending on light intensity with the image-selecting rotary shutter 12 being rotated 360°. Then during the vertical blanking interval the stored charges are transferred to transfer gate in response to a given clock signal. The charge storing and transferring operation of the CCD imaging element is well known in the art, and further description thereof is omitted. It is to be noted, however, that four similar but different images are formed on the imaging element 11, and therefore, a resultant output signal from the CCD imager 11 includes such picture information including four different images.

FIGS. 9A and 9B are diagrams similar to FIGS. 8A and 8B. The timing chart of FIG. 9A and the view of the image-selecting rotary shutter 12 of FIG. 9B are used for describing the operation when a pickup tube is used instead of the CCD imager as the pickup element 11. Assuming that the recess 32 is provided between the slits or openings 5a and 5d in the same manner as described in the above, a time length corresponding to the phase difference Δt2 between the vertical sync signal and the signal from the rotation sensor 34 is delayed by the delay circuit 38 of FIG. 7 in the same manner as described in the above. When a pickup tube is used in place of the solid-state imager 11, it is necessary that the state of raster, i.e. electron beam scanning, does not interfere the movement of the image-selecting rotary shutter 12 through which picture information is written into the picture tube. In FIG. 9B, a picture area of the picture tube is shown by dotted lines. During a period in which upper half of the picture area is used for reading information, i.e. scanning is performed in the upper half, a lower half of the same is exposed to receive optical information given through the opening 12a. On the other hand, during next period in which the lower half is scanned to read out information, the upper half is exposed. In this way, upper and lower halves of the picture area of the picture tube are alternately used for writing (exposure) and reading (scanning). To this end, a larger amount of delay is required as the delay time given by the delay circuit 38.

Although it has been described that the rotary shutter has four openings 5a–5d, the same effect can be obtained when a rotatry shutter having only two openings is rotated at a speed twice the speed of the rotary shutter 12. In this case, the angle of the opening subtending with respect to the center of rotary shutter has to be twice that of the rotary shutter 12 so as to provide the shutter speed of 1/1080 second.

Figure 10:
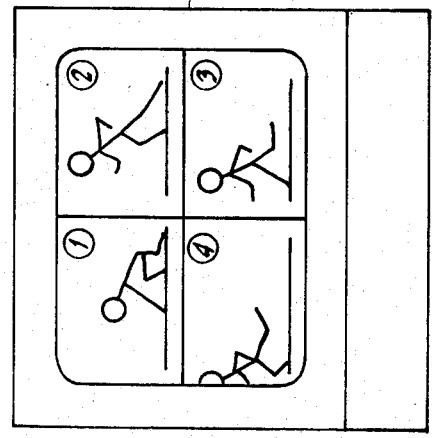
FIG. 10 shows a front view of a monitor television on which CRT screen are imaged four different images respectively picked up by the four areas of the CCD imager or the pickup tube used in place of the CCD imager.

FIG. 10 shows a front view of a monitor television 13 on which CRT screen are imaged four different images respectively picked up by the four areas of the CCD imager or the pickup tube used in place of the CCD imager. More specifically, the four different images ① ② ③ and ④ are first obtained in sequence at an interval of 1/240 second within a period of 1/60 second since the four real images respectively obtained by the four lenses 8a–8d of the multi-lens assembly 8 are applied in a given order as the image-selecting rotary shutter 12 rotates.

With this arrangement, therefore, it is now possible to image an object at a speed of 1/240 second using standard system (NTSC system) in which scanning is performed at a speed of 1/60 second. Furthermore, the pickup device or element as well as video signal recording/reproducing apparatus which are used for the standard system can be used without particular changes.

In this way according to the present invention a plurality, such as four, of images having time difference therebetween are obtained on a single screen. Therefore, although the size of each image of the taken object 2 is made small, high speed image pickup is now possible with standard video signal recording/reproducing apparatus.

While the above-mentioned embodiment provides high speed image pickup at an interval of 1/240 second, this speed can be increased by increasing the number of lenses of the multi-lens assembly. For instance, when 8 lenses are arranged in an annular fashion to form a multi-lens assembly, the angle of the opening 12a of the image-selecting rotary shutter 12 is reduced to 45°, and the number of openings of the other rotary shutter 5 is increased to 8. In this way, each image is taken at a speed of 1/480 second so that 8 images are taken during 1/60 second. This is just an example, and therefore, a shutter speed higher than 1/480 can also be provided in a similar manner.

Figure 12:
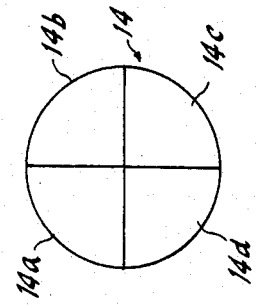
FIG. 12 is a top plan view of a prism shown in FIG. 11.
Figure 11:
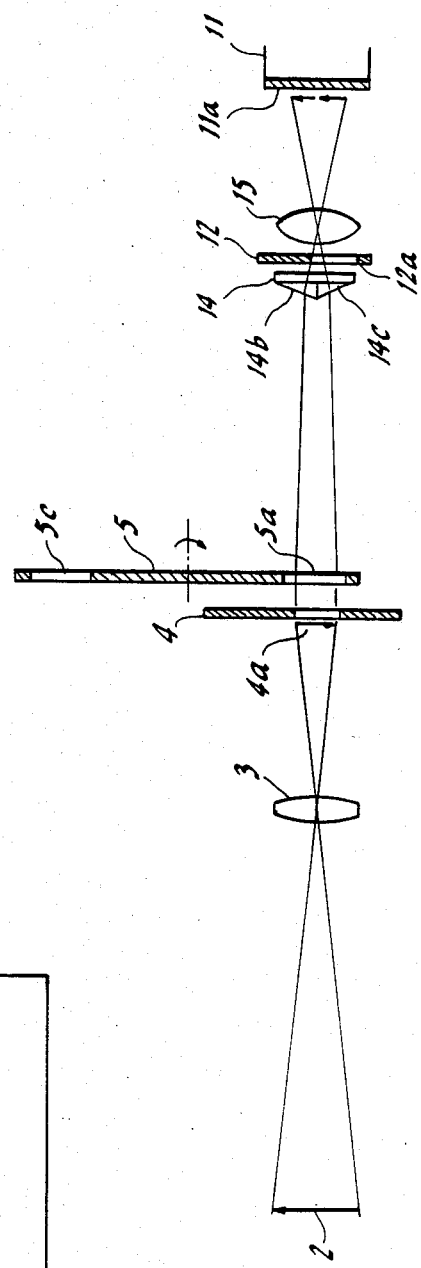
FIG. 11 illustrates a second embodiment video camera according to the present invention.

FIG. 11 illustrates a second embodiment video camera accoding to the present invention. This second embodiment mainly differs from the first embodiment of FIG. 1 in that the multi-lens assembly 8 is replaced with a prism 14 having four light-receiving surfaces 14a–14d which are inclined with respect to its rear surface. FIG. 12 is a top plan view of the prism 14. As this prism 14 may be used one known as "Mirage" manufactured by Kenko Filter Inc. of Japan. This prism known as "Mirage" is used in combination with a television camera when it is intended to arrange a plurality of an identical image within a single picture to make visionary scene. The prism 14 having four light-receiving surfaces 14a–14d operates as a beam splitter in the same manner as the multi-lens assembly 8 of the first embodiment. Therefore, four images are produced which are selectively transmitted in sequence through the opening 12a of the image-selecting rotary shutter 12. As a result, four different images are formed on the imaging plane 11a of the image pickup device 11 within a period of 1/60 second in the same manner as in the first embodiment. The reference 15 is a close up lens used for forming the images successively transmitted through the opening 12a with the length of each side of the images being reduced to one half.

As described in the above the light beam of a real image of the object 2 is split into a plurality, and resulted images formed by the plurality of beams are passed through the opening 12a of the image-selecting rotary shutter 12 in sequence. As a result a plurality of images are formed on a picture imaging plane of the pickup element or device 11, such as a solid state imager or a pickup tube where each image has time difference such as 1/240 second in the case that four images are produced for the single object 2. Therefore, it is advantageous for analysis of an ojbect moving or varying at a very high speed. Since the high speed image taking system according to the present invention requires only the change in the optical system of a video camera without changing the system of image pickup, high speed image pickup and reproduction can be performed readily at a low cost. Furthemore, since the video camera according to the present invention has a single optical system, various manipulation and operation such as focussing, adjustment of diaphragm and zooming may be simple when compared with a conventional system using a plurality of video cameras. In addition when a lens with a C-mount having no parallax is used as the main lens, the main lens can be readily replaced with another having different focal length.

The above-described embodiments are just examples of the present invention, and therefore, it will be apparent for those skilled in the art that many modifications and variations may be made without departing from the scope of the present invention.

What is claimed is:

1. A high-speed video camera comprising:
   (a) a main lens for producing a light beam of a taking object;
   (b) a first shutter means for selectively transmitting said light beam from said main lens;
   (c) beam splitting means responsive to said light beam from said first shutter means for producing a plurality of substantially identical light beams;
   (d) a second shutter means for transmitting said plurality of light beams in sequence in synchronism with said first shutter means; and
   (e) image pickup means responsive to said plurality of light beams passed through said second shutter means.

2. A high-speed video camera as claimed in claim 1, wherein said beam splitting means comprises a multi-lens assembly having a plurality of lenses arranged on a single plane.

3. A high-speed video camera as claimed in claim 1, wherein said beam splitting means comprises a prism having a plurality of light-receiving surfaces.

4. A high-speed video camera as claimed in claim 1, wherein said first shutter means comprises a rotary shutter having one or more openings.

5. A high-speed video camera as claimed in claim 1, wherein said second shutter means comprises a rotary shutter having one opening.

6. A high-speed video camera as claimed in claim 1, wherein said first and second shutter means are mechanically coupled to be synchronized with each other.

7. A high-speed video camera as claimed in claim 1, further comprising means for synchronizing the operation of said first and second shutter means with a vertical synchronous signal of a predetermined frequency.

8. A high-speed video camera as claimed in claim 7, wherein the synchronizing means comprises a sensor for detecting the position of said first or second shutter means, an adjustable delay circuit responsive to either a vertical synchronous signal of a predetermined frequency or to an output signal from said sensor, a circuit for detecting phase difference between said vertical synchronous signal and said output signal from said sensor one of which has been delayed by said delay circuit, and a control circuit responsive to said phase difference for controlling a motor which drives said first and second shutter means.

9. A high-speed video camera as claimed in claim 4, wherein the number of beams to be produced by said beam splitting means equal the number of said openings made in said first shutter means.

10. A high-speed video camera as claimed in claim 4, wherein the number of said openings made in said first shutter means is n wherein "n" is the number of beams to be produced by said beam splitting means, said first shutter means being rotated at a speed higher than that of said second shutter means.

11. A method of high-speed imaging for a video camera, comprising the steps of:
(a) producing a light beam of a taking object;
(b) intermittently transmitting said light beam to determine an exposure time;
(c) splitting said light beam intermittently transmitted into a plurality of beams having substantially the same image information; and
(d) transmitting said plurality of beams in sequence so as to form a plurality of different images on an image pickup plane of an imaging device.

* * * * *